(12) United States Patent
Sakhnini et al.

(10) Patent No.: US 11,696,342 B2
(45) Date of Patent: Jul. 4, 2023

(54) PROBABILISTIC RANDOM ACCESS

(71) Applicant: QUALCOMM Incorporated, San Diego, CA (US)

(72) Inventors: Iyab Issam Sakhnini, San Diego, CA (US); Tao Luo, San Diego, CA (US); Wanshi Chen, San Diego, CA (US); Mahmoud Taherzadeh Boroujeni, San Diego, CA (US); Juan Montojo, San Diego, CA (US); Peter Gaal, San Diego, CA (US); Qiang Wu, San Diego, CA (US); Yuchul Kim, San Diego, CA (US); Linhai He, San Diego, CA (US); Junyi Li, Fairless Hills, PA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/365,584

(22) Filed: Jul. 1, 2021

(65) Prior Publication Data

US 2022/0007435 A1    Jan. 6, 2022

Related U.S. Application Data

(60) Provisional application No. 63/047,617, filed on Jul. 2, 2020.

(51) Int. Cl.
*H04W 74/08* (2009.01)
*H04W 74/00* (2009.01)
(Continued)

(52) U.S. Cl.
CPC ..... *H04W 74/0841* (2013.01); *H04W 68/005* (2013.01); *H04W 72/046* (2013.01);
(Continued)

(58) Field of Classification Search
CPC ........... H04W 74/0841; H04W 68/005; H04W 72/0446; H04W 72/0453; H04W 72/046;
(Continued)

(56) References Cited

U.S. PATENT DOCUMENTS

2021/0051736 A1* 2/2021 Jeon ..................... H04W 76/18
2021/0307073 A1* 9/2021 Huang .............. H04W 74/0833

OTHER PUBLICATIONS

CMCC: "Discussion on Procedure of 2-Step RACH", 3GPP Draft, R1-1910160, 3GPP TSG RAN WG1 #98bis, 3rd Generation Partnership Project (3GPP), Mobile Competence Centre, 650, Route Des Lucioles, F-06921 Sophia-Antipolis Cedex, France, vol. RAN WG1. No. Chongqing, China, Oct. 14, 2019-Oct. 20, 2019, Oct. 1, 2019 (Oct. 1, 2019), XP05180819, 7 Pages, Retrieved from the Internet: URL:https://ftp.3gpp.org/tsg_ran/WG1_RL1/TSGR1_98b/Docs/R1-1910168.zip, R1-1910160.docx [retrieved on Oct. 1, 2019] the whole document.

(Continued)

*Primary Examiner* — Thai Nguyen
(74) *Attorney, Agent, or Firm* — Arent Fox LLP/Qualcomm Incorporated

(57) ABSTRACT

Generating, by a user equipment (UE) of a wireless access network, for a set of contention-based random access occasions of a base station of the network, a random number over an interval. For the generated random number meeting a threshold value within the interval, transmitting, by the UE and to the base station, a random access preamble within one of the random access occasions of the set. For the generated random number not meeting the threshold value, attempting, by the UE, contention-based access to the network within a subsequent set of random access occasions of the base station, the subsequent set of random access occasions occurring after the set of contention-based random access occasions of the base station.

24 Claims, 11 Drawing Sheets

(51) Int. Cl.
    *H04W 72/0446* (2023.01)
    *H04W 68/00* (2009.01)
    *H04W 72/044* (2023.01)
    *H04W 80/02* (2009.01)
    *H04W 72/0453* (2023.01)

(52) U.S. Cl.
    CPC ... *H04W 72/0446* (2013.01); *H04W 72/0453* (2013.01); *H04W 74/006* (2013.01); *H04W 80/02* (2013.01)

(58) Field of Classification Search
    CPC .............. H04W 74/006; H04W 80/02; H04W 74/0833; H04W 74/085; H04W 76/10; H03M 13/1125
    See application file for complete search history.

(56) References Cited

OTHER PUBLICATIONS

International Search Report and Written Opinion—PCT/US2021/040309—ISA/EPO—dated Oct. 28, 2021.
LG Electronics: "Discussion on Channel Structure for 2-Step RACH", R1-1912262, 3GPP TSG RAN WG1 Meeting #99, 3rd Generation Partnership Project (3GPP), Mobile Competence Centre, 650, Route Des Lucioles, F-06921 Sophia-Antipolis Cedex, France, vol. RAN WG1. No. Reno. USA, Nov. 18, 2019-Nov. 22, 2019, Nov. 9, 2019 (Nov. 9, 2019), XP051823327, 14 Pages, Retrieved from the Internet: URL:https://ftp.3gpp.org/tsg_ran/WG1_RL1/TSGR1_99/Docs/R1-1912262.zip R1-1912262 LG_RACH structure final.docx, the whole document.
Nokia, et al., "Increasing Tx Opportunities for Msg1", R2-1913215, 3GPP TSG-RAN WG2 Meeting #107bis, Increasing Tx Opportunities for Msg1, 3rd Generation Partnership Project (3GPP), Mobile Competence Centre, 650, Route Des Lucioles, F-06921 Sophia-Antipolis Cedex, France, vol. RAN WG2. No. Chongqing, China, Oct. 14, 2019-Oct. 18, 2019, Oct. 4, 2019, XP051004905, Retrieved from the Internet: URL:https://ftp.3gpp.org/tsg_ran/WG2_RL2/TSGR2_107bis/Docs/R2-1913215.zip, R2-1913215 Increasing Tx opportunities for Msg1.docx, the whole document.
Zte, et al., "Consideration on the Load Balance Between 2-Step RACH and 4-Step RACH", 3GPP TSG-WG2 Meeting #106, R2-1906305_Consideration on the Load Balance Between 2-Step RACH and 4-Step RACH, 3rd Generation Partnership Project (3GPP), Mobile Competence Centre, 650, Route Des Lucioles, F-06921, So, No. USA, Reno, May 13, 2019-May 17, 2019, May 13, 2019, XP051729772, 3 Pages, Retrieved from the Internet: URL:http://www.3gpp.org/ftp/Meetings%5F3GPP%5FSYNC/RAN2/Docs/R2%2D1906305%2Ezip [retrieved on May 13, 2019] the whole document.

* cited by examiner

PROBABILISTIC RANDOM ACCESS

CROSS-REFERENCE TO RELATED APPLICATION

The present Application claims priority to U.S. Provisional patent application Ser. No. 63/047,617, filed Jul. 20, 2020, entitled "PROBABILISTIC RANDOM ACCESS," which is assigned to the assignee hereof, and is hereby expressly incorporated by reference herein in its entirety.

BACKGROUND

Technical Field

The present disclosure relates generally to communication systems, and more particularly in some examples, to random access processes for user equipment of a wireless communication access network.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

The technology disclosed herein includes method, apparatus, and computer-readable media including instructions for wireless communication. In such technology, a user equipment (UE) of a wireless network generates, for a set of contention-based random access occasions of a base station of the network, a random number over an interval. For the generated random number meeting a threshold value within the interval, the UE transmits to the base station a random access preamble within one of the random access occasions of the set. For the generated random number not meeting the threshold value, the UE attempts contention-based access to the network within a subsequent set of random access occasions of the base station, the subsequent set of random access occasions occurring after the set of contention-based random access occasions of the base station.

In some examples of the technology disclosed herein, the set of random access occasions is one of: a set of {time slot, frequency, beam} tuples; a set of {time slot, frequency} tuples; a set of {time slot, beam} tuples; a set of {frequency, beam} tuples; a set of time slots; or a set of frequencies.

In some examples, the UE receives, from the base station prior to transmitting, the threshold value as an information element in at least one of a Radio Resource Control Message, a Downlink Control Information (DCI) message, a Medium Access Control-Control Element (MAC-CE) message, and a paging message. In some such examples, the threshold value remains valid i) until the threshold value is explicitly changed by the base station, or ii) until a predetermined period of time expires.

In some examples, upon either i) the generated random number not meeting the threshold value or ii) the UE not obtaining access in response to transmitting the random access preamble, the UE changes the threshold value before attempting the contention-based access to the network within the subsequent set of random access occasions of the base station. In some such examples, the UE increases the threshold value. In some such examples, the UE decreases the threshold value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
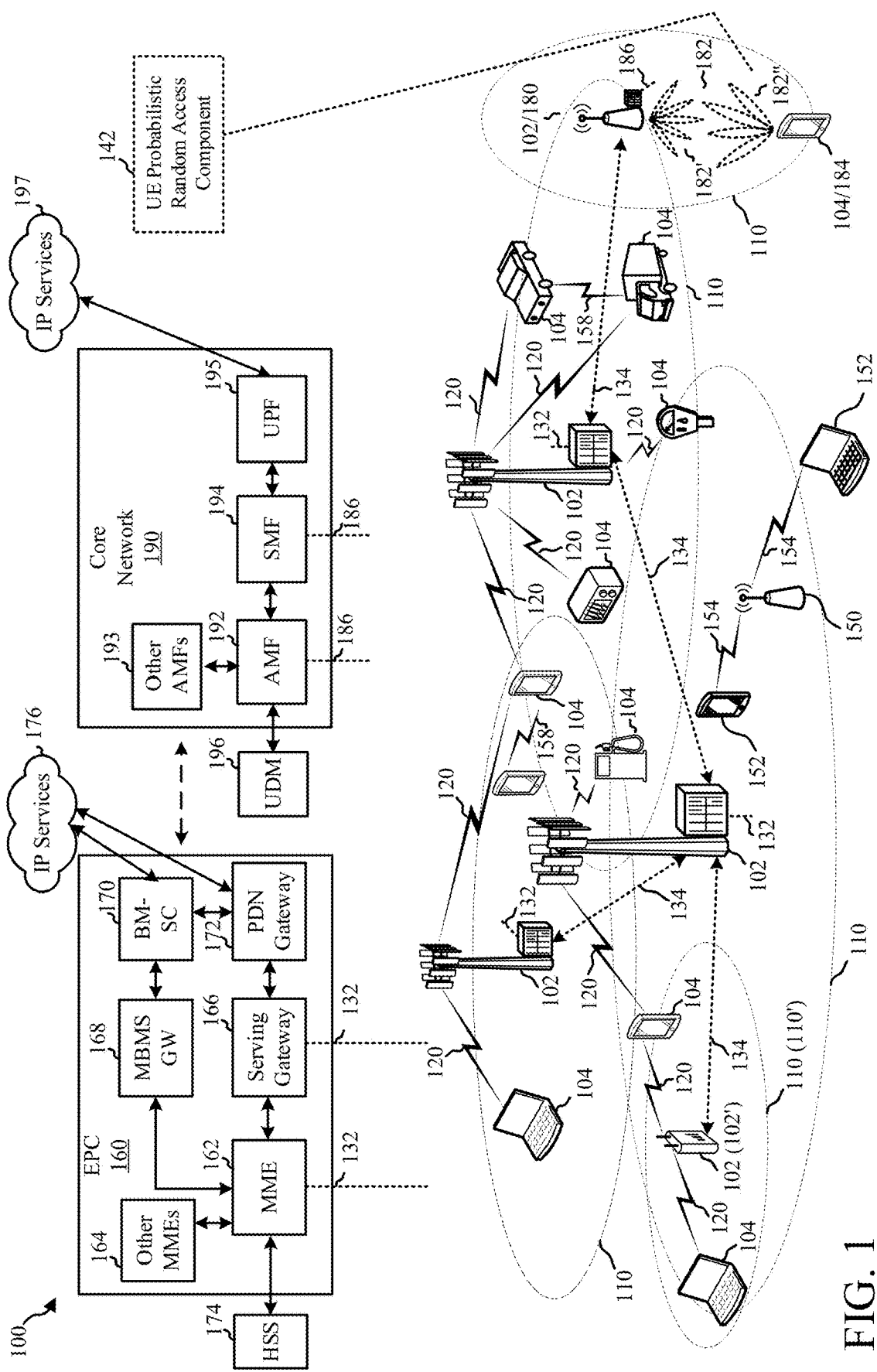
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Use cases that have been identified for 5G NR include wearables, industrial wireless sensors (typically stationary devices, an mMTC usage scenario), and video surveillance (typically stationary)—each use case implicating a category of devices sometimes referred to as "reduced capability" (RedCap). Common characteristics of RedCap devices include lower complexity, lower cost, smaller size. Some RedCap device scenarios present higher potential spatial density and concentrated temporal demand for access to the wireless communication infrastructure.

In particular, for stationary RedCap devices, the distribution of UEs within the coverage of a base station such as a gNB may be such that certain beams of the base station have much more UEs demanding access than other beams—leading to potential overloading of the high-demand beams. In certain cases, many RedCap/IoT devices may best connect to the same cell or beam, and many of the RedCap/IoT devices may attempt to access the network using contention-based random access channel (RACH) or physical random access channel (PRACH) procedures within the same random access occasion. For example, many rentable bicycles or scooters parked at a high demand location can attempt network access when unlocked at almost the same time (e.g., during rush hour). As another example, co-located stationary industrial cameras and sensors may be scheduled to upload data to server over the wireless communication network at one or more specific times each day. A random access occasion (RO), or "RACH occasion" or "PRACH occasion" includes the collection of resource elements dedicated to random access.

In aspects of the present disclosure, methods, non-transitory computer readable media, and apparatuses are provided. In some examples of the technology disclosed herein, a user equipment (UE) of a wireless network generates, for a set of contention-based random access occasions of a base station of the network, a random number over an interval. For the generated random number meeting a threshold value within the interval, the UE transmits to the base station a random access preamble within one of the random access occasions of the set. For the generated random number not meeting the threshold value, the UE attempts contention-based access to the network within a subsequent set of random access occasions of the base station, the subsequent set of random access occasions occurring after the set of contention-based random access occasions of the base station.

In some examples of the technology disclosed herein, the set of random access occasions is one of: a set of {time slot, frequency, beam} tuples; a set of {time slot, frequency} tuples; a set of {time slot, beam} tuples; a set of {frequency, beam} tuples; a set of time slots; or a set of frequencies.

In some examples, the UE receives, from the base station prior to transmitting, the threshold value as an information element in at least one of a Radio Resource Control Message, a Downlink Control Information (DCI) message, a Medium Access Control-Control Element (MAC-CE) message, and a paging message. In some such examples, the threshold value remains valid i) until the threshold value is explicitly changed by the base station, or ii) until a predetermined period of time expires.

In some examples, upon either i) the generated random number not meeting the threshold value or ii) the UE not obtaining access in response to transmitting the random access preamble, the UE changes the threshold value before attempting the contention-based access to the network within the subsequent set of random access occasions of the base station. In some such examples, the UE increases the threshold value. In some such examples, the UE decreases the threshold value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 186. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first, second and third backhaul links 132, 186 and 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. In some examples of the technology disclosed herein, both the DL and the UL between the base station and a UE use the same set of multiple beams to transmit/receive physical channels. For example, a given set of beams can carry the multiple copies of a Physical Downlink Shared Channel (PDSCH) on the DL and can carry multiple copies of a Physical Uplink Control Channel (PUCCH) on the UL.

The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR. The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available. The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in one or more frequency bands within the electromagnetic spectrum. The base station 180 and the UE 104 may each include a plurality of antennas, such as antenna elements, antenna panels, and/or antenna arrays to facilitate the beamforming.

The electromagnetic spectrum is often subdivided, based on frequency/wavelength, into various classes, bands, channels, etc. In 5G NR two initial operating bands have been identified as frequency range designations FR1 (410 MHz- 7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming with the UE 104/184 to compensate for the path loss and short range using beams 182.

The base station 180 may transmit a beamformed signal to the UE 104/184 in one or more transmit directions 182'. The UE 104/184 may receive the beamformed signal from the base station 180 in one or more receive directions 182". The UE 104/184 may also transmit a beamformed signal to the base station 180 in one or more transmit directions. The base station 180 may receive the beamformed signal from the UE 104 in one or more receive directions. The base station 180/UE 104/184 may perform beam training to determine the best receive and transmit directions for each of the base station 180/UE 104/184. The transmit and receive directions for the base station 180 may or may not be the same. The transmit and receive directions for the UE 104/184 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Continuing to refer to FIG. 1, in certain aspects, the UE 104 is configured to generate a random number over an interval for a set of contention-based random access occasions of a base station 102 over links such as communication link 120. For the generated random number meeting a threshold value within the interval, the UE 104 transmits to the base station 102 a random access preamble within one of the random access occasions of the set. For the generated random number not meeting the threshold value, the UE 104 attempts contention-based access to the network within a subsequent set of random access occasions of the base station 102, the subsequent set of random access occasions occurring after the set of contention-based random access occasions of the base station. The UE 104 can use UE Probabilistic Random Access Component 142 for performing this generation, transmission, and attempted subsequent access.

Although the following description may be focused on 5GNR, the concepts described herein may be applicable to other similar areas, such as LTE, LTE-A, CDMA, GSM, and other wireless technologies.

Figures 2A, 2B:
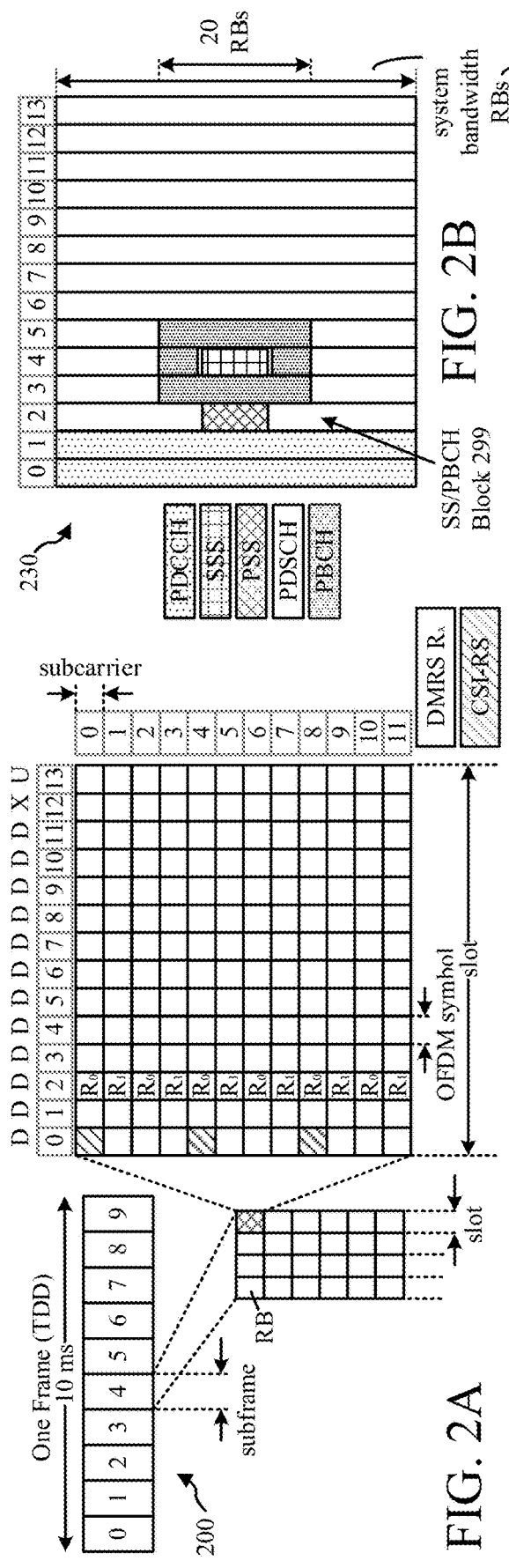
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.
Figures 2C, 2D:
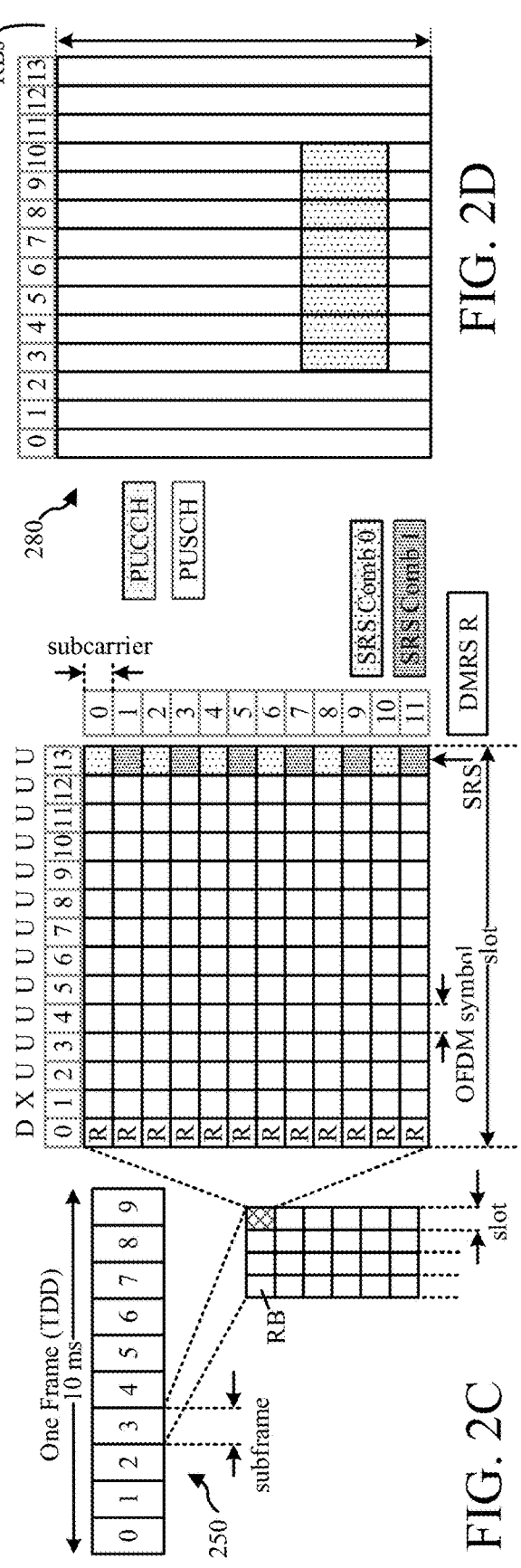

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS). Some examples of the technology disclosed herein use the DM-RS of the physical downlink control channel (PDCCH) to aid in channel estimation (and eventual demodulation of the user data portions) of the physical downlink shared channel (PDSCH).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK)/negative ACK (HACK) feedback. The PUSCH carries data and may additionally be used to carry a buffer status report (BSR), a power headroom report (PHR), and/or UCI.

Figure 3:
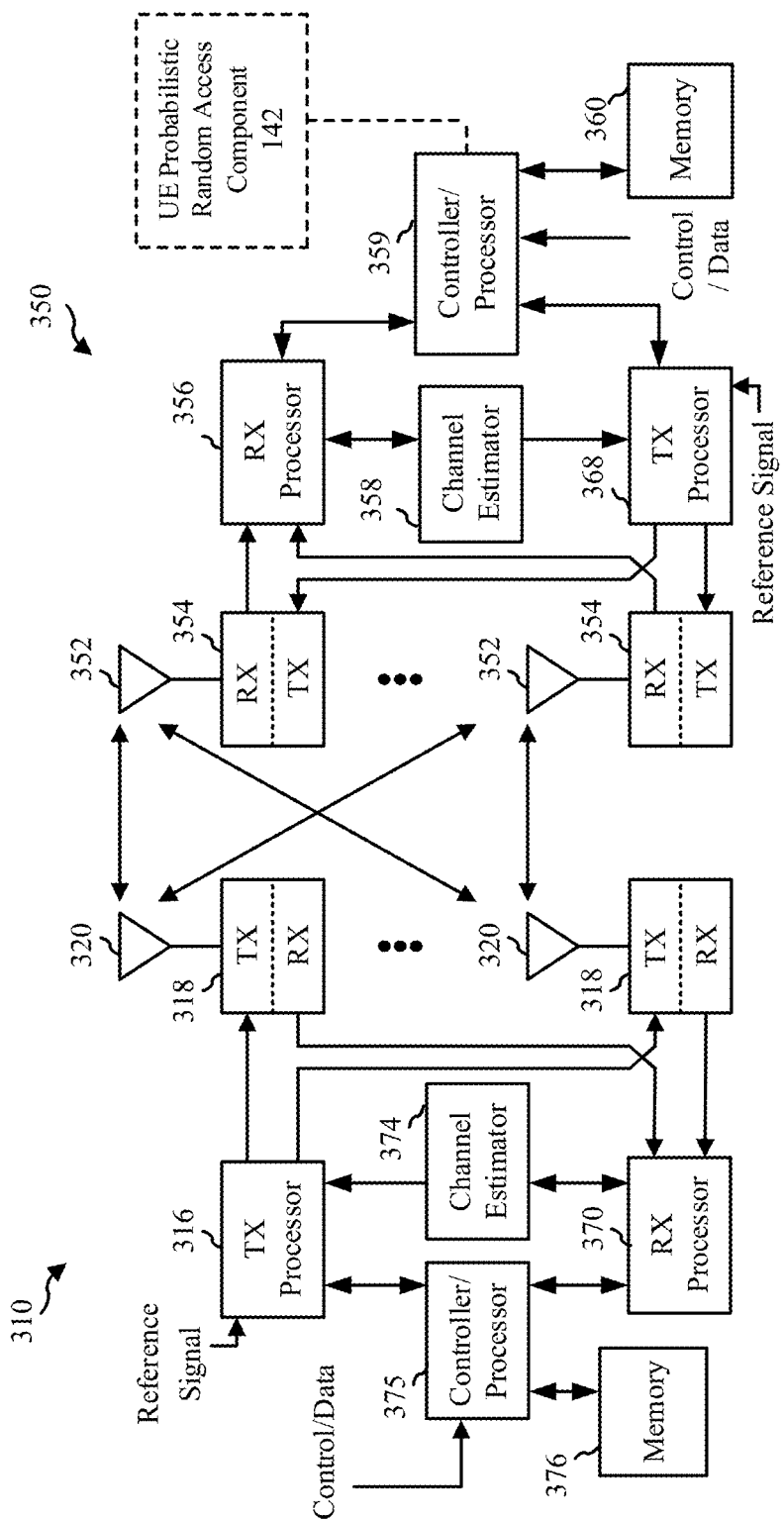
FIG. 3 is a diagram illustrating a base station and user equipment (UE) in an access network, in accordance with examples of the technology disclosed herein.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Continuing to refer to FIG. 3, and continuing to refer to prior figures for context, in certain aspects, the UE 350 is configured to generate a random number (e.g., using one or more of controller processor 359 executing UE Probabilistic Random Access Component 142) over an interval for a set of contention-based random access occasions of a base station 310 over links such as communication link 120. For the generated random number meeting a threshold value within the interval, the UE 350 transmits (e.g., using TX Processor 368, TX 354 and antenna system 352) to the base station 310 a random access preamble within one of the random access occasion of the set. For the generated random number not meeting the threshold value, the UE 350 attempts contention-based access to the network (e.g., through base station 310) within a subsequent set of random access occasion of the base station 310. The UE 350 can use UE Probabilistic Random Access Component 142 for performing this generation, transmission, and attempted subsequent access.

In mathematics, a tuple is a finite ordered list (sequence) of elements. An n-tuple is a sequence (or ordered list) of n elements, where n is a non-negative integer, e.g., 1-tuple (i.e., a single), 2-tuple (i.e., a couple), 3-tuple (triple), 4-tuple (i.e., a quadruple), 5-tuple (i.e., a quintuple), 6-tuple (i.e., a sextuple), etc. In certain aspects, the set random access occasions is characterized by one of: a set of {time slot, frequency, beam} tuples (e.g., a set of {time slot, frequency, beam} 3-tuples), distributing the set of random access occasions across times, frequencies, and beams; a set of {time slot, frequency} tuples (e.g., a set of {time slot, frequency} 2-tuples), distributing the set of random access occasions across times and frequencies, on a single beam; a set of {time slot, beam} tuples, distributing the set of random access occasion across multiple time slots and beams, on a single frequency; a set of {frequency, beam} tuples, distributing the set of random access occasion across frequencies and beams, in a single time slot; a set of time slots distributing the set of random access occasion across time slots on a single {frequency, beam} tuple; and a set of frequencies distributing the set of random access occasion across frequencies on a single {time slot, beam} tuple. In certain aspects, the UE 350 receives, from the base station 310 prior to transmitting, the threshold value as an information element in at least one of a Radio Resource Control Message, a Downlink Control Information (DCI) message, a Medium Access Control-Control Element (MAC-CE) message, and a paging message. In some such examples, the threshold value remains valid i) until the threshold value is explicitly changed by the base station, or ii) until a predetermined period of time expires.

In some examples, upon either i) the generated random number not meeting the threshold value or ii) the UE 350 not obtaining access in response to transmitting the random access preamble, the UE 350 (e.g., using UE Probabilistic Random Access Component 142) changes the threshold value before attempting the contention-based access to the network within the subsequent set of random access occasion of the base station 310. In some such examples, the UE 350 increases the threshold value. In some such examples, the UE 350 decreases the threshold value.

Figure 4:
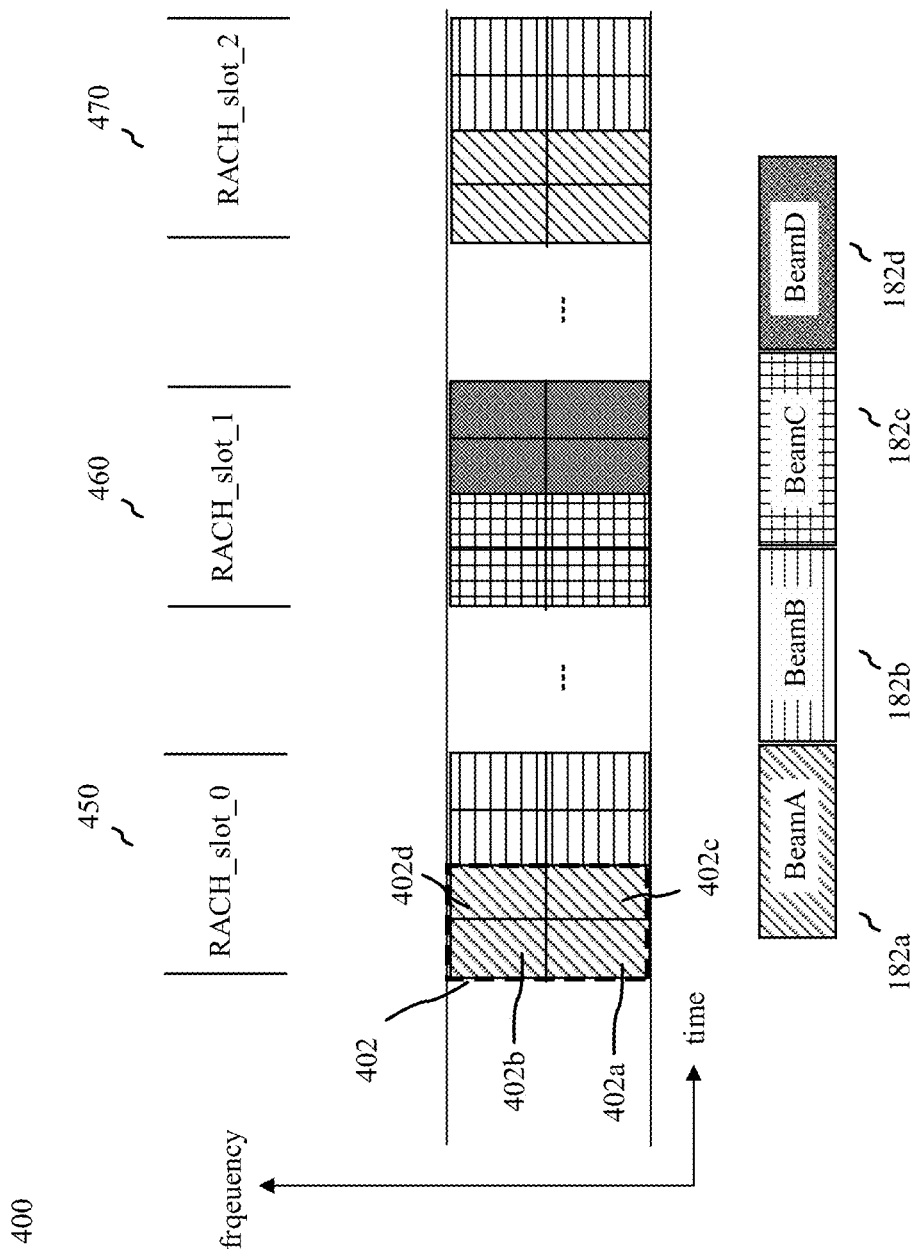
FIG. 4 is a diagram illustrating a section of a notional 5G NR frame structure for a base station.

Referring to FIG. 4, and continuing to refer to prior figures for context, a section of a notional 5G NR frame structure 400 for a base station, such as base station 180, is shown. BeamA 182a, BeamB 182b, BeamC 182c, and BeamD 182d are shown as allotted certain resources for contention-based random access across RACH_slot_0 450 (BeamA 182a, BeamB 182b) and RACH_slot_1 460 (BeamC 182c, and BeamD 182d)—and then beginning to repeat across the same beams 182 with RACH_slot_2. In a conventional RACH procedure, a UE, such as UE 184, receives configuration information from the base station 180 broadcast to all UEs within range of the base station 180, even those UEs not yet granted access to the wireless network. The configuration information indicates a set of resources, e.g., resource set 402, within which any UE can transmit a random access preamble as part of a contention-based random access procedure—each of the resources (402a, 402b, 402c, and 402d) is called a "random access occasion" (RO) or "RACH occasion" for transmitting the random access preamble. In a conventional RACH procedure, the UE 184 transmits a random access preamble within any one of the four ROs (402a, 402b, 402c, and 402d); meaning that the probability of random access preamble transmission in the resource set 402 of ROs is 100%, and the probability of the UE 184 transmitting a random access preamble in any one RO is 25%.

Figure 5:
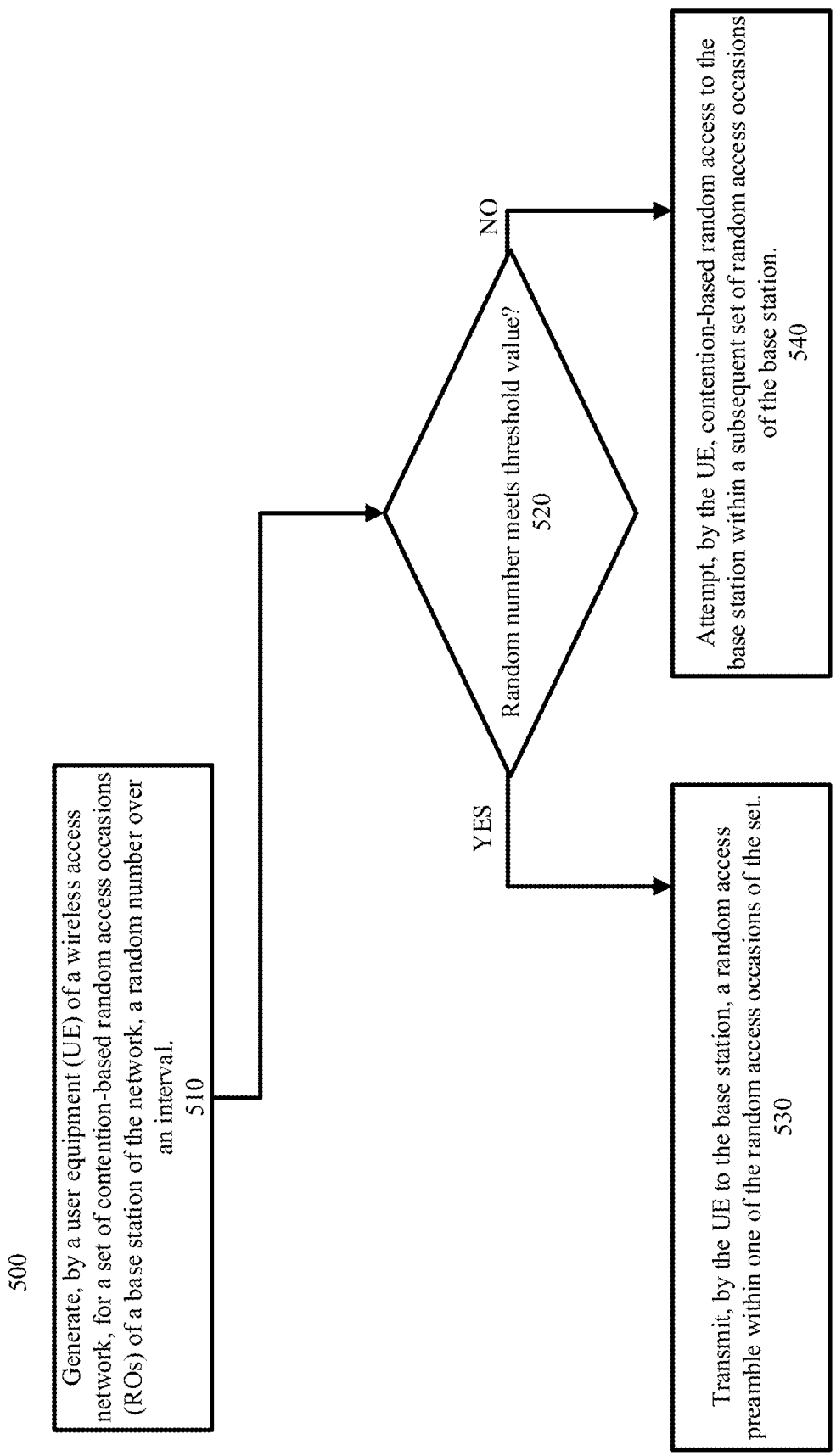
FIG. 5 a flowchart of methods of wireless communication is shown, in accordance with examples of the technology disclosed herein.
Figure 6:
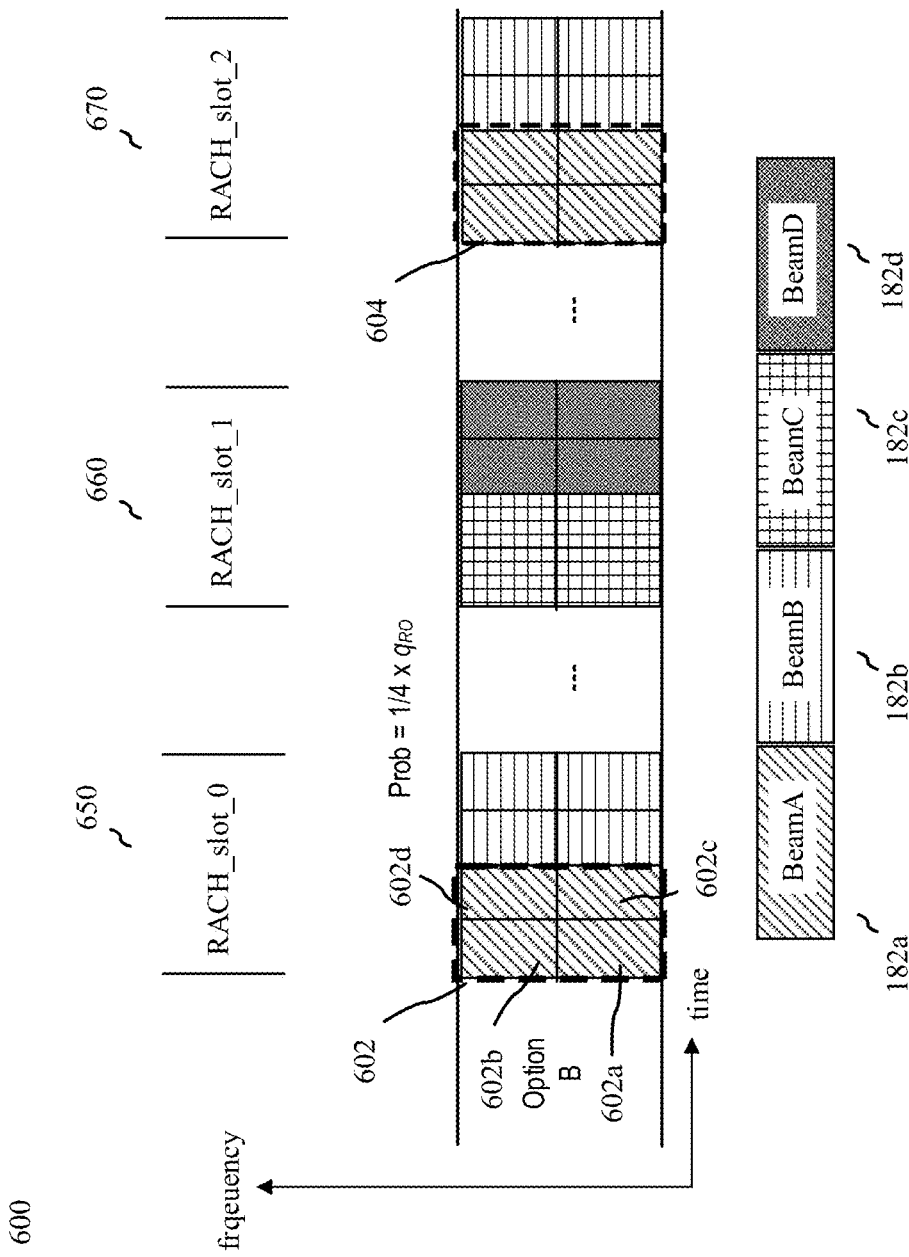
FIG. 6 is a diagram illustrating a section of a notional 5G NR frame structure for base station, in accordance with examples of the technology disclosed herein.

Referring to FIG. 5, and continuing to refer to prior figures for context, a flowchart of methods 500 of wireless communication is shown, in accordance with examples of the technology disclosed herein. In such methods 500, the UE 184 generates, for a set of contention-based ROs of a base station 180 of the network, a random number over an interval—Block 510. Referring to FIG. 6, and continuing to refer to prior figures for context, a section of a notional 5G NR frame structure 600 for base station 180 is shown as part of a continuing example. In the continuing example, the interval is [0, 1]. FIG. 6 shows a set 602 of four contention-based ROs 602a, 602b, 602c, and 602d—similar to the set of ROs in FIG. 4—on resources allocated to BeamA 182a in RACH_slot_0 650. BeamB 182b is also allocated RACH resources in RACH_slot_0 650, while BeamC 182c and BeamD 182d are allocated RACH resources in RACH_slot_1 660. The set of ROs for BeamA 182a repeats, subsequent to the time of set 602, as set 604 when the frame structure begins to repeat beam RACH allocations in RACH_slot_2. The set of ROs for BeamA 182a remains within the PRACH quasi-co-location (QCL) for BeamA 182a—within the ROs 602a, 602b, 602c, and 602d associated with the synchronization signal block (SSB) that the UE 184 is using. This RO set 602 structure spreads the ROs 602a, 602b, 602c, and 602d across time and frequency. The set of contention-based ROs can contain one or more ROs. Note that, as in the example of FIG. 6, for a subsequent set to occur after a set, every RO of the subsequent set is later in time relative to all ROs of the set.

Figure 11:
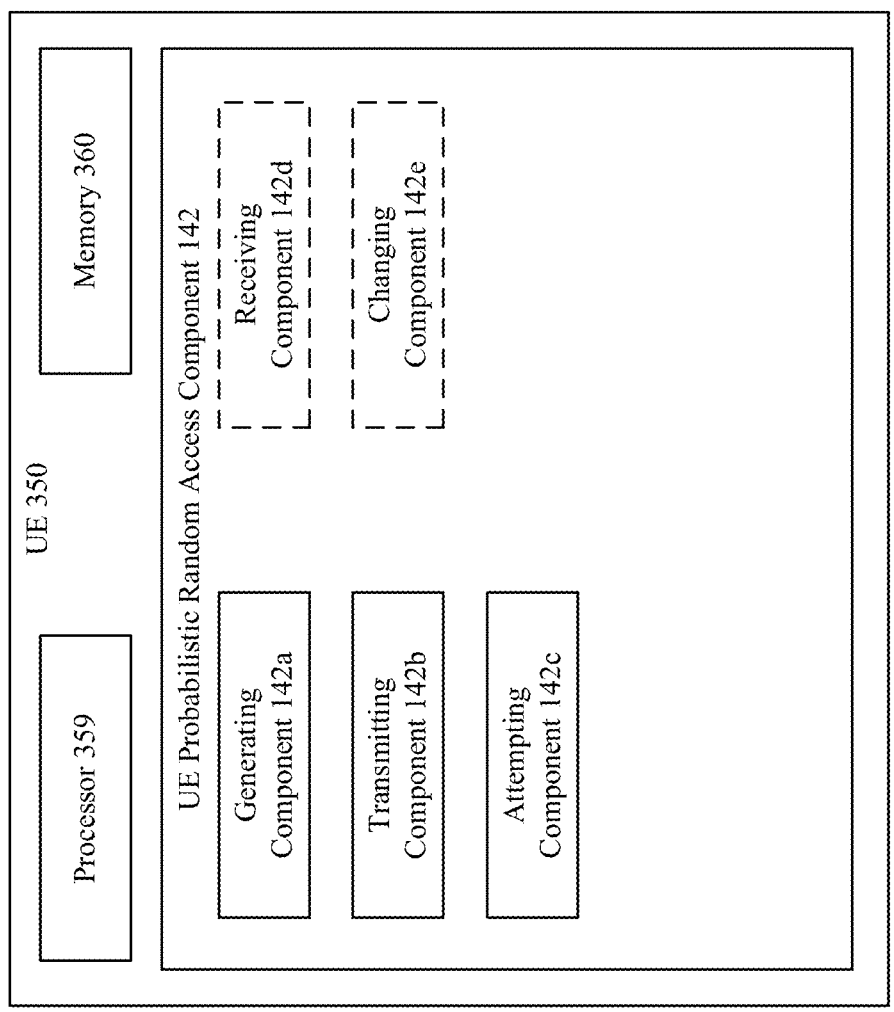
FIG. 11 is a block diagram of a UE, in accordance with examples of the technology disclosed herein.

Referring to FIG. 11, and continuing to refer to prior figures for context, another representation of the UE 350 for wireless communication of FIG. 3 is shown, in accordance with examples of the technology disclosed herein. UE 350 includes UE Probabilistic Random Access Component 142, controller/processor 359, and memory 360, as described in conjunction with FIG. 3 above. UE Probabilistic Random Access Component 142 includes Generating Component 142a. In some examples, the Generating Component 142a generates, for a set of contention-based ROs of a base station 180 of the network, a random number over an interval. Accordingly, Generating Component 142a may provide means for generating, for a set of contention-based ROs of a base station 180 of the network, a random number over an interval.

Referring again to FIG. 5, for a generated random number meeting a threshold value within the interval, the UE 184 transmits to the base station 180 a random access preamble within one of the random access occasions (ROs) of the set—Block 520 (yes), Block 530. In the continuing example, the threshold ($q_{RO}$) is 0.8, and the UE 184 generates 0.45 as a random number on the interval [0, 1]. Given that the random number (0.45) is less than or equal to $q_{RO}$ (0.8), the UE 184 transmits a random access preamble in one of the ROs 602a, 602b, 602c, 602d) of the set of ROs 602. In NR, SS/PBCH block to PRACH (RO) beam association is used for the base station 180 to know what beam 182 the UE 184 is using. There can be one SS/PBCH block (also referred to as "SSB") to many ROs or many SS/PBCH blocks to one RO. The association is done in the frequency domain, then in time domain within a RACH slot, then in time domain across RACH slots. Referring again to FIG. 6, each of the ROs 602a, 602b, 602c, and 602d has (¼ $q_{RO}$)% likelihood of being used by the UE 184 to send a random access preamble to the base station 180 within RO set 602.

While in the continuing example, the generated random number "meeting the threshold value" corresponds to the generated random number being less than or equal to the threshold value, other relationships can be used as long as those relationships maintain the logic that for a given set of ROs, the UE 184 can have less than 100% chance of transmitting a random access preamble to the base station 180. This approach can be used, as disclosed herein, to spread the random access preambles received at the base station over time, frequency, and space (beam and SSB).

Referring again to FIG. 11, and continuing to refer to prior figures for context, UE Probabilistic Random Access Component 142 includes Transmitting Component 142b. In some examples, the Transmitting Component 142b transmits, for a generated random number meeting a threshold value within the interval, to the base station 180 a random access preamble within one of the random accesses occasions (ROs) of the set. Accordingly, Transmitting Component 142b may provide means for transmitting, for a generated random number meeting a threshold value within the interval, to the base station 180 a random access preamble within one of the random accesses occasions (ROs) of the set.

Referring again to FIG. 5, for a generated random number not meeting the threshold value within the interval, the UE 184 attempts contention-based random access to the base station within a subsequent set of random access occasions of the base station 180—Block 520 (no), Block 540. Referring again to FIG. 6, in a variation of the continuing example, the UE 184 generates 0.9 as a random number on the interval [0, 1]. Given that the random number (0.9) is greater than $q_{RO}$ (0.8), the UE 184 does not transmit a random access preamble in one of the ROs (602a, 602b, 602c, 602d) of the set of ROs 602, but waits until the next set of ROs. In the continuing example, the subsequent set of ROs is set 604 in RACH_slot_2 670 and occurs after the set of contention-based random access occasions 602 of the base station.

Referring again to FIG. 11, and continuing to refer to prior figures for context, UE Probabilistic Random Access Component 142 includes Attempting Component 142c. In some examples, the Attempting Component 142c attempts, for a generated random number not meeting the threshold value within the interval, contention-based random access to the base station within a subsequent set of random access occasions of the base station 180. Accordingly, Attempting Component 142c may provide means for attempting, for a generated random number not meeting the threshold value within the interval, contention-based random access to the base station within a subsequent set of random access occasions of the base station 180.

In some aspects, the RO set is characterized by one of: a set of {time slot, frequency, beam} tuples, distributing the random access occasion across multiple time slots, frequencies, and beams; a set of {time slot, frequency} tuples, distributing the random access occasion across multiple time slots and frequencies, on a single beam; a set of {time slot, beam} tuples, distributing the random access occasion across multiple time slots and beams, on a single frequency; a set of {frequency, beam} tuples, distributing the random access occasion across multiple frequencies and beams, in a single time slot; a set of time slots distributing the random access occasion across time slots on a single {frequency, beam} tuple; and a set of frequencies distributing the random access occasion across frequencies on a single {time slot, beam} tuple.

Figure 7:
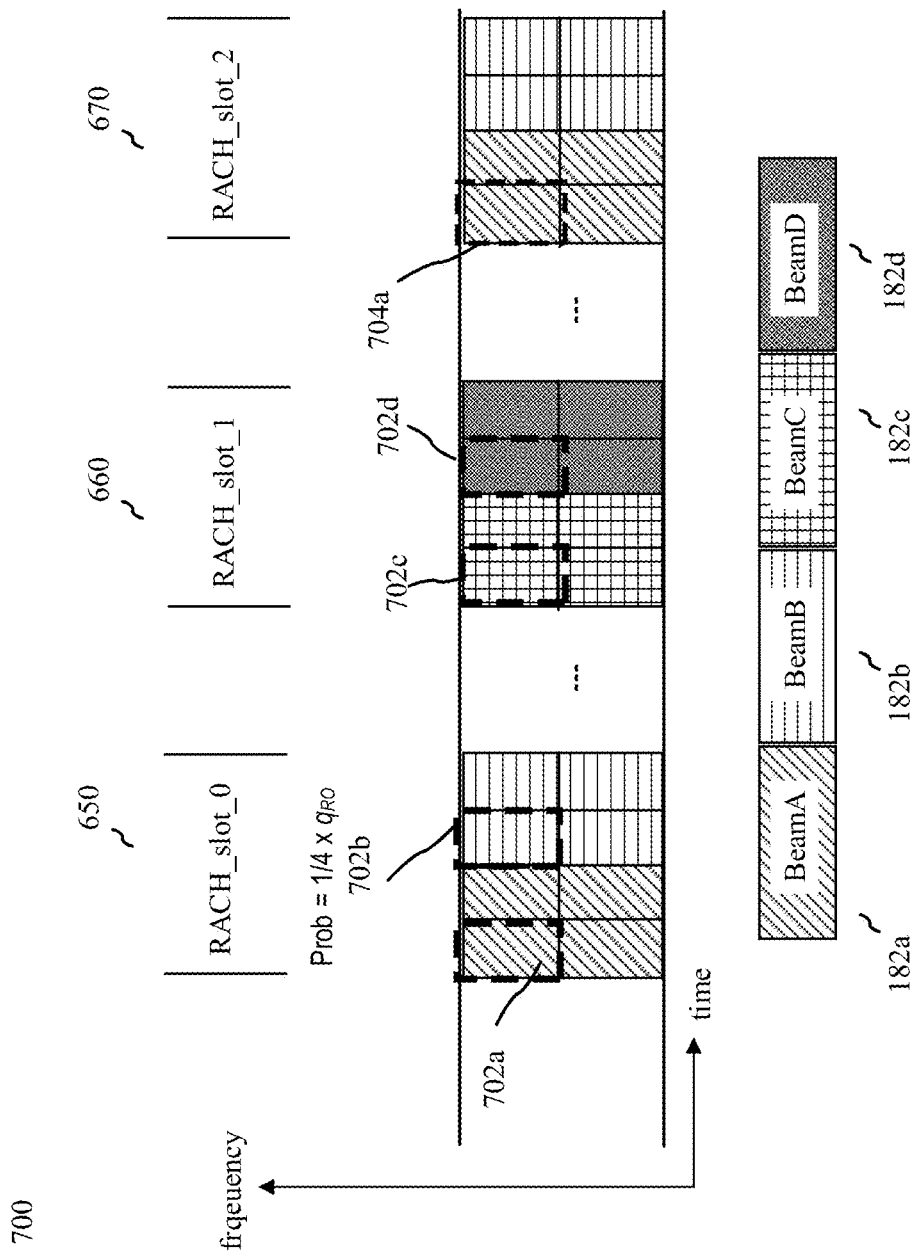
FIG. 7 is a diagram illustrating a section of a notional 5G NR frame structure for base station, in accordance with examples of the technology disclosed herein.

Referring to FIG. 7, and continuing to refer to prior figures for context, a section of a notional 5G NR frame structure 700 for base station 180 is shown, in accordance with examples of the technology disclosed herein. This RO set 702 in frame structure 700 spreads the ROs of RO set 702 across beams on a given frequency: RO 702a/BeamA 182a, RO 702b/BeamB 182b, RO 702c/BeamC 182c, and RO 702d/BeamD 182d. The next subsequent RO set 704 begins in RACH_slot_2 670 with RO 704a/BeamA 182a. The probability that any one RO in RO set 702 will transmit a random access preamble is (¼ $q_{RO}$)×100%.

Figure 8:
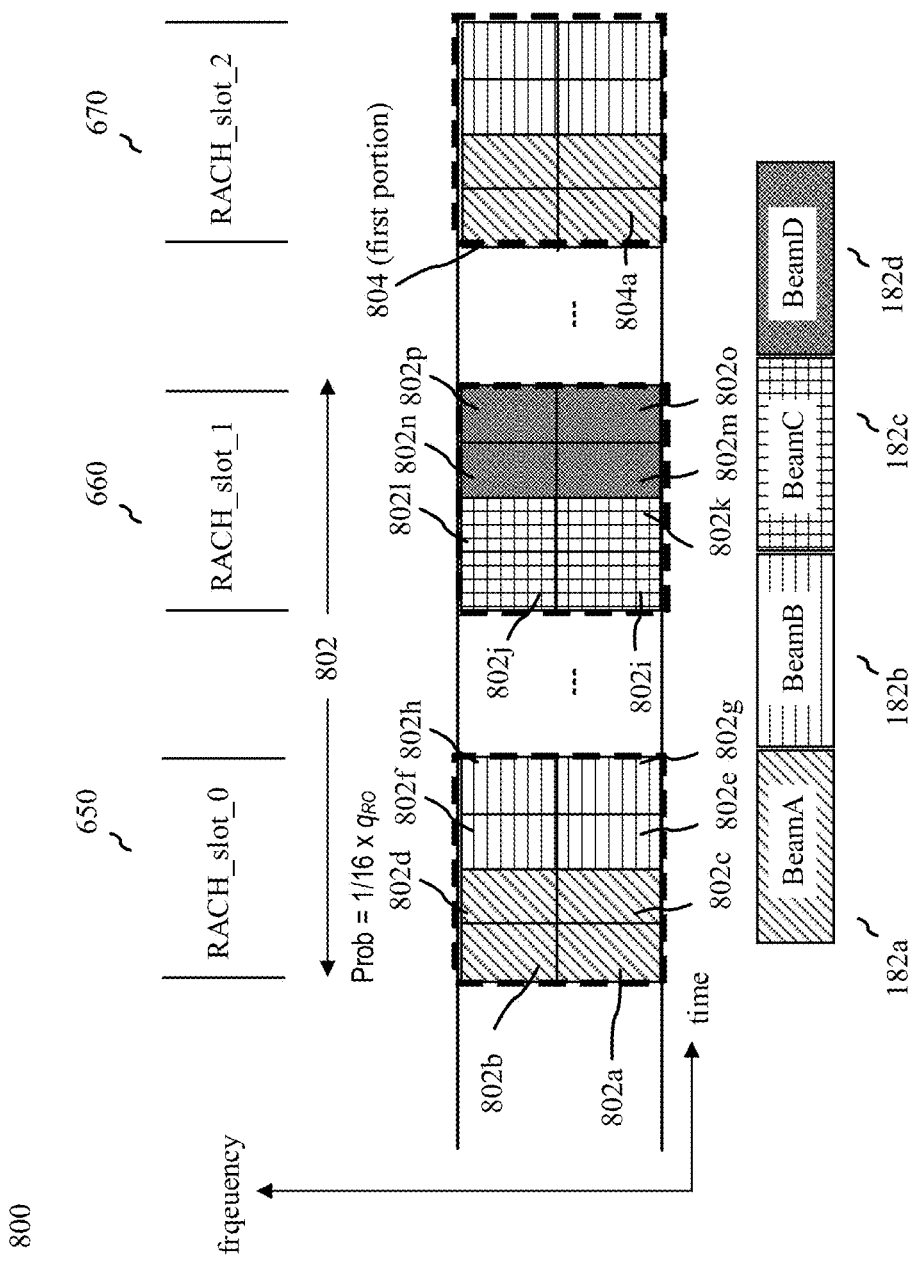
FIG. 8 is a diagram illustrating a section of a notional 5G NR frame structure for base station, in accordance with examples of the technology disclosed herein.

Referring to FIG. 8, and continuing to refer to prior figures for context, a section of a notional 5G NR frame structure 800 for base station 180 is shown, in accordance with examples of the technology disclosed herein. This RO set 802 in frame structure 800 spreads the ROs across time, frequency, and space (beam/SSB). In particular, each RO in RO set 802 increases first in frequency, then in time, then by beam across RACH slots. The next subsequent RO set 804 begins in RACH_slot_2 670 with RO 804a/BeamA 182a. The probability that any one RO in RO set 802 will contain a random access preamble is (1/16 $q_{RO}$)%.

Figure 9:
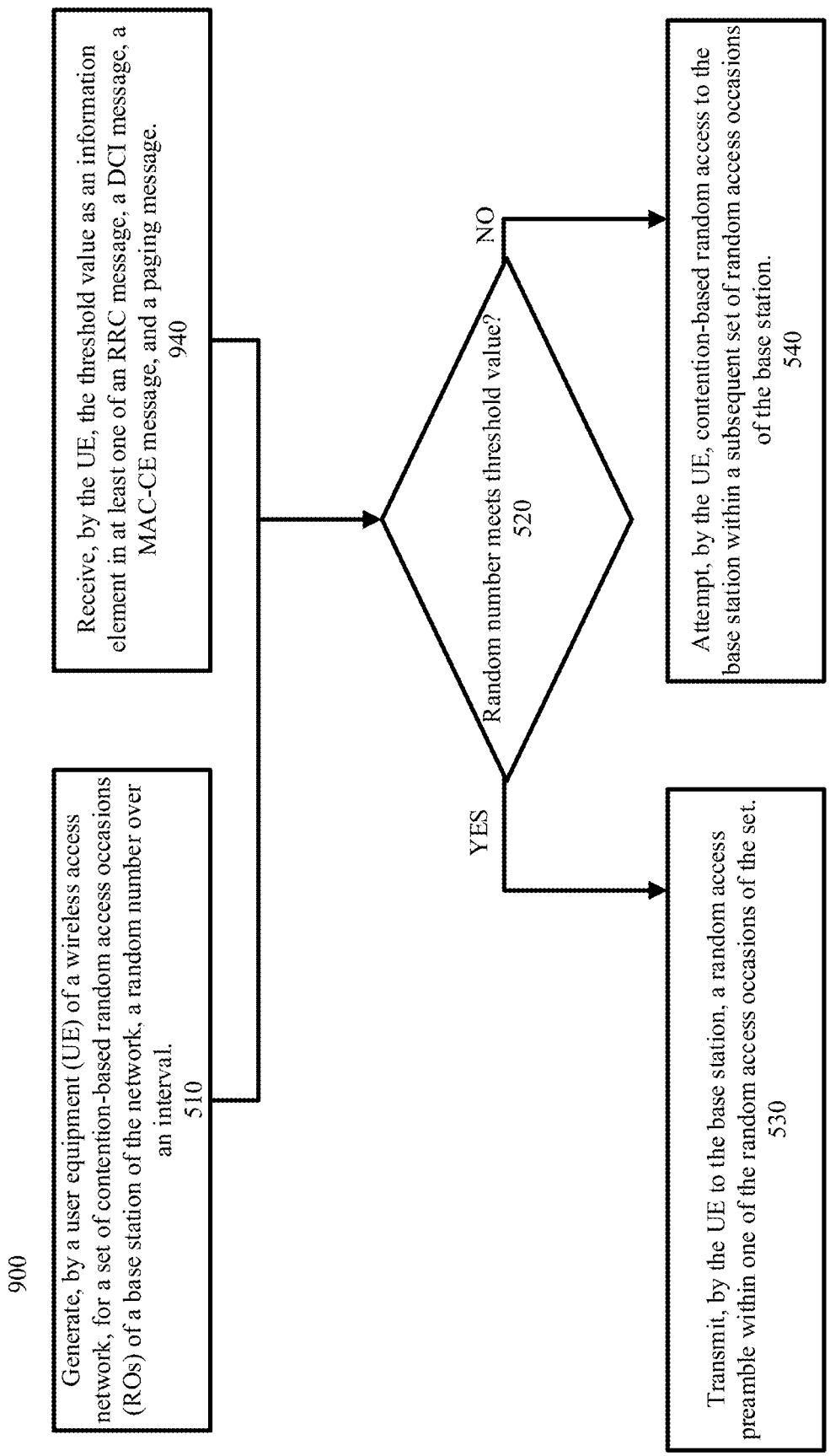
FIG. 9 a flowchart of methods of wireless communication is shown, in accordance with examples of the technology disclosed herein.

Referring to FIG. 9, and continuing to refer to prior figures for context, a flowchart of methods 900 of wireless communication is shown, in accordance with examples of the technology disclosed herein. In such methods 900, Block 510, Block 520, Block 530, and Block 540 are performed as described in connection with FIG. 5. In such methods, the UE 184 receives, from the base station 180 prior to transmitting, the threshold value as an information element in at least one of a Radio Resource Control Message, a Downlink Control Information (DCI) message, a Medium Access Control—Control Element (MAC-CE) message, and a paging message—Block 940.

For example, the value of $q_{RO}$ can be received by the UE 184 semi-statically (e.g., in RRC), or dynamically (in DCI, MAC-CE, or a paging message), or included in a Random Access Response (MSG.2) in the case of a prior collision. In some aspects, value $q_{RO}$ can change according to a predefined pattern.

Referring again to FIG. 11, and continuing to refer to prior figures for context, UE Probabilistic Random Access Component 142 includes Receiving Component 142d. In some examples, the Receiving Component 142d the UE 184 receives, from the base station 180 prior to transmitting, the threshold value as an information element in at least one of a Radio Resource Control Message, a Downlink Control Information (DCI) message, a Medium Access Control-Control Element (MAC-CE) message, and a paging message. Accordingly, Receiving Component 142d may provide means for the UE 184 receiving, from the base station 180 prior to transmitting, the threshold value as an information element in at least one of a Radio Resource Control Message, a Downlink Control Information (DCI) message, a Medium Access Control-Control Element (MAC-CE) message, and a paging message.

Figure 10:
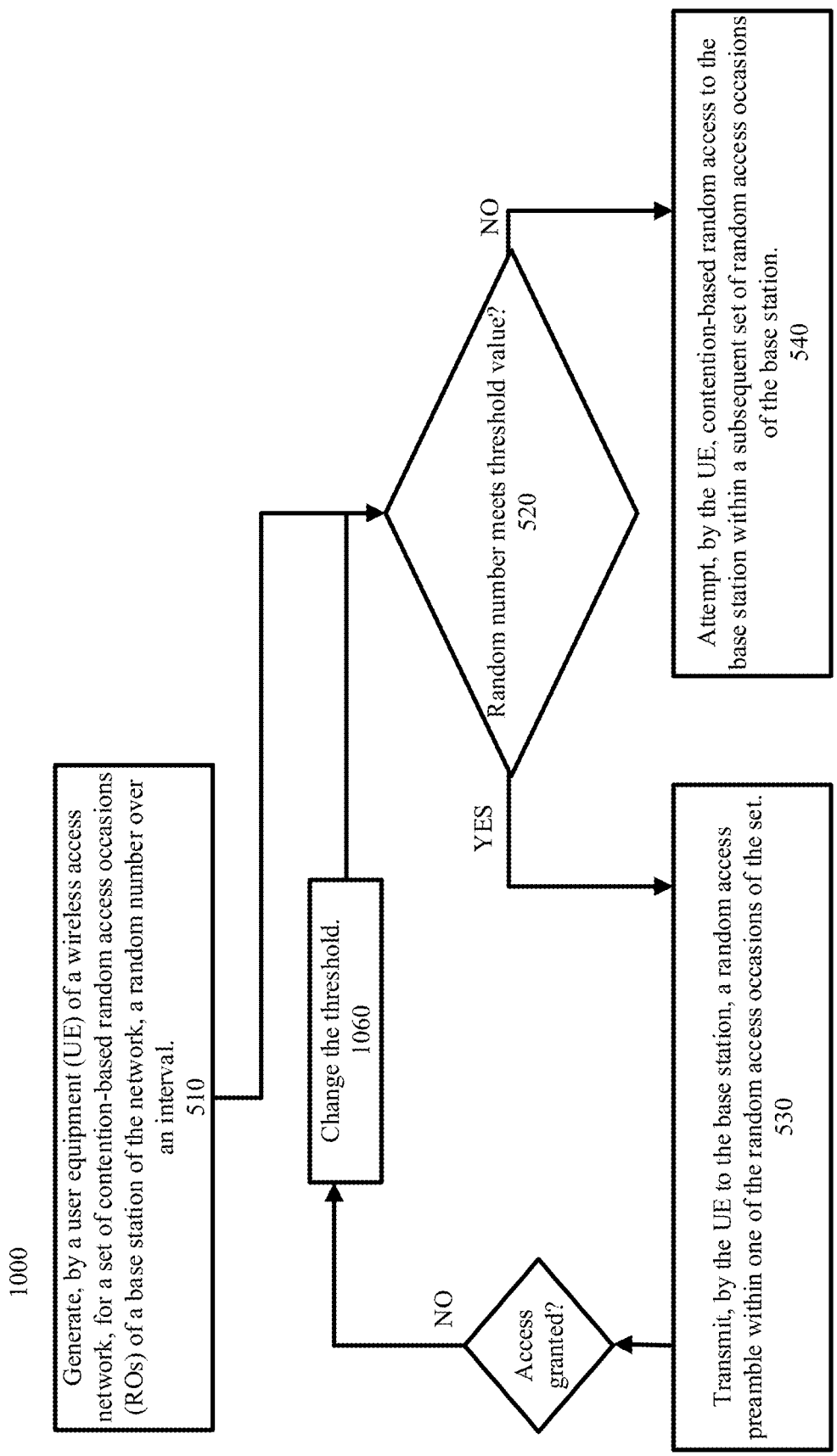
FIG. 10 a flowchart of methods of wireless communication is shown, in accordance with examples of the technology disclosed herein.

Referring to FIG. 10, and continuing to refer to prior figures for context, a flowchart of methods 1000 of wireless communication is shown, in accordance with examples of the technology disclosed herein. In such methods 1000, Block 510, Block 520, Block 530, and Block 540 are performed as described in connection with FIG. 5. In such methods, upon either i) the generated random number not meeting the threshold value or ii) the UE 184 not obtaining access in response to transmitting the random access preamble, the UE 184 changes the threshold value before attempting the contention-based access to the network within the subsequent random access occasion of the base station 180—Block 1050 (no) Block 1060. Such a change can be based on rules (either embodied in the UE 184 or the base station 180/network).

The value of $q_{RO}$ can be configured to change across failed attempts for consecutive RACH slots. For example, value of $q_{RO}$ can be set to "1" if the random access preamble was not sent after a configured number of attempts where the generated random number was greater than value of $q_{RO}$. As another example, the UE can incrementally increase the value of $q_{RO}$ over if the random access preamble was not sent after a configured number of attempts where the generated random number was greater than value of $q_{RO}$. As another example, the UE can incrementally increase the value of $q_{RO}$ over if the random access preamble was sent but a collision occurred—cause the specific UE 184 to back off and allow other UEs to successfully connect with the base station 180 in a contention-based random access process.

The following examples are illustrative only and aspects thereof may be combined with aspects of other embodiments or teaching described herein, without limitation.

Example 1 is method of wireless communication, including generating, by a user equipment (UE) of a wireless access network, for a set of contention-based random access occasions of a base station of the network, a random number over an interval. For the generated random number meeting a threshold value within the interval, transmitting, by the UE and to the base station, a random access preamble within one of the random access occasions of the set. For the generated random number not meeting the threshold value, attempting, by the UE, contention-based access to the network within a subsequent set of random access occasions of the base station, the subsequent set of random access occasions occurring after the set of contention-based random access occasions of the base station.

In Example 2 the method of Example 1 further includes wherein the set of random access occasion is one of: a set of {time slot, frequency, beam} tuples, distributing the set of random access occasions across times, frequencies, and beams; a set of {time slot, frequency} tuples, distributing the set of random access occasions across times and frequencies, on a single beam; a set of {time slot, beam} tuples, distributing the set of random access occasion across multiple time slots and beams, on a single frequency; a set of {frequency, beam} tuples, distributing the set of random access occasion across frequencies and beams, in a single time slot; a set of time slots distributing the set of random access occasion across time slots on a single {frequency, beam} tuple; and a set of frequencies distributing the set of random access occasion across frequencies on a single {time slot, beam} tuple.

In Example 3 the method of Example 1 or Example 2 further includes receiving, by the UE and from the base station prior to transmitting, the threshold value as an information element in at least one of a Radio Resource Control Message, a Downlink Control Information (DCI) message, a Medium Access Control-Control Element (MAC-CE) message, and a paging message. In Example 4, the method of any of Examples 1-3 further includes wherein the threshold value remains valid i) until the threshold value is explicitly changed by the base station, or ii) until a predetermined period of time expires.

In Example 5 the method of any of Examples 1-4 further includes upon either i) the generated random number not meeting the threshold value or ii) the UE not obtaining access in response to transmitting the random access preamble: changing, by the UE, the threshold value before attempting the contention-based access to the network within the subsequent set of random access occasions of the base station. In Example 6 the method of Example 5 includes increasing threshold value. In Example 6 the method of Example 5 includes decreasing the threshold value.

Example 8 includes an apparatus for wireless communication, comprising: a memory; and at least one processor coupled to the memory and configured to execute the method of any one or more of examples 1-7. Example 9 includes a computer-readable medium storing computer executable code, the code when executed by a processor cause the processor to execute the method of any one or more of claims 1-7. Example 10 includes an apparatus for wireless communications, including means for executing the method of any one or more of claims 1-7.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

We claim:

1. A method of wireless communication, comprising:
generating, by a user equipment (UE) of a wireless network, for a set of random access occasions of a base station of the wireless network, a random number over an interval;
for the generated random number meeting a threshold value within the interval, transmitting, by the UE and to the base station, a random access preamble within one of the random access occasions of the set of random access occasions;
for the generated random number not meeting the threshold value, attempting, by the UE, contention-based access to the wireless network within a subsequent set of random access occasions of the base station, the subsequent set of random access occasions occurring after the set of random access occasions of the base station; and
receiving, by the UE and from the base station prior to transmitting, the threshold value as an information element in at least one of a Radio Resource Control Message, a Downlink Control Information (DCI) message, a Medium Access Control-Control Element (MAC-CE) message, and a paging message.

2. The method of claim 1, wherein the set of random access occasions is one of:
a set of {time slot, frequency, beam} tuples, distributing the set of random access occasions across times, frequencies, and beams;
a set of {time slot, frequency} tuples, distributing the set of random access occasions across times and frequencies, on a single beam;
a set of {time slot, beam} tuples, distributing the set of random access occasions across multiple time slots and beams, on a single frequency;
a set of {frequency, beam} tuples, distributing the set of random access occasions across frequencies and beams, in a single time slot;
a set of time slots distributing the set of random access occasions across time slots on a single {frequency, beam} tuple; and
a set of frequencies distributing the set of random access occasions across frequencies on a single {time slot, beam} tuple.

3. The method of claim 1, wherein the threshold value remains valid i) until the threshold value is explicitly changed by the base station, or ii) until a predetermined period of time expires.

4. The method of claim 1 further comprising, upon either i) the generated random number not meeting the threshold value or ii) the UE not obtaining access in response to transmitting the random access preamble:
changing, by the UE, the threshold value before attempting the contention-based access to the wireless network within the subsequent set of random access occasions of the base station.

5. The method of claim 4 further comprising upon the generated random number not meeting the threshold value, increasing the threshold value.

6. The method of claim 4 further comprising upon the UE not obtaining access in response to transmitting the random access preamble, decreasing the threshold value.

7. A user equipment (UE) for wireless communication, comprising:
a memory; and
at least one processor coupled to the memory, the memory including instructions executable by the at least one processor to cause the UE to:
generate, for a set of random access occasions of a base station of a wireless network, a random number over an interval;
for the generated random number meeting a threshold value within the interval, transmit, to the base station a random access preamble within one of the random access occasions of the set;
for the generated random number not meeting the threshold value, attempt contention-based access to the wireless network within a subsequent set of random access occasions of the base station, the subsequent set of random access occasions occurring after the set of random access occasions of the base station; and
receive, from the base station prior to transmitting, the threshold value as an information element in at least one of a Radio Resource Control Message, a Downlink Control Information (DCI) message, a Medium Access Control-Control Element (MAC-CE) message, and a paging message.

8. The user equipment of claim 7, wherein the set of random access occasions is one of:
a set of {time slot, frequency, beam} tuples, distributing the set of random access occasions across times, frequencies, and beams;
a set of {time slot, frequency} tuples, distributing the set of random access occasions across times and frequencies, on a single beam;
a set of {time slot, beam} tuples, distributing the set of random access occasions across multiple time slots and beams, on a single frequency;
a set of {frequency, beam} tuples, distributing the set of random access occasions across frequencies and beams, in a single time slot;
a set of time slots distributing the set of random access occasions across time slots on a single {frequency, beam} tuple; and
a set of frequencies distributing the set of random access occasions across frequencies on a single {time slot, beam} tuple.

9. The user equipment of claim 7, wherein the threshold value remains valid i) until the threshold value is explicitly changed by the base station, or ii) until a predetermined period of time expires.

10. The user equipment of claim 7, wherein the memory further includes instructions executable by the at least one processor to cause the UE to, upon either i) the generated random number not meeting the threshold value or ii) the UE not obtaining access in response to transmitting the random access preamble:
change the threshold value before attempting the contention-based access to the wireless network within the subsequent set of random access occasions of the base station.

11. The user equipment of claim 10, wherein the memory further includes instructions executable by the at least one processor to cause the UE to increase the threshold value upon the generated random number not meeting the threshold value.

12. The user equipment of claim 10, wherein the memory further includes instructions executable by the at least one processor to cause the UE to decrease the threshold value upon the UE not obtaining access in response to transmitting the random access preamble.

13. A non-transitory computer-readable medium storing computer executable code, the code when executed by a processor cause the processor to:
   generate, for a set of random access occasions of a base station of a wireless network, a random number over an interval;
   for the generated random number meeting a threshold value within the interval, transmit, to the base station, a random access preamble within one of the random access occasions of the set;
   for the generated random number not meeting the threshold value, attempt contention-based access to the wireless network within a subsequent set of random access occasions of the base station, the subsequent set of random access occasions occurring after the set of random access occasions of the base station; and
   receive, from the base station prior to transmitting, the threshold value as an information element in at least one of a Radio Resource Control Message, a Downlink Control Information (DCI) message, a Medium Access Control-Control Element (MAC-CE) message, and a paging message.

14. The non-transitory computer-readable medium of claim 13, wherein the set of random access occasions is one of:
   a set of {time slot, frequency, beam} tuples, distributing the set of random access occasions across times, frequencies, and beams;
   a set of {time slot, frequency} tuples, distributing the set of random access occasions across times and frequencies, on a single beam;
   a set of {time slot, beam} tuples, distributing the set of random access occasions across multiple time slots and beams, on a single frequency;
   a set of {frequency, beam} tuples, distributing the set of random access occasions across frequencies and beams, in a single time slot;
   a set of time slots distributing the set of random access occasions across time slots on a single {frequency, beam} tuple; and
   a set of frequencies distributing the set of random access occasions across frequencies on a single {time slot, beam} tuple.

15. The non-transitory computer-readable medium of claim 13, wherein the threshold value remains valid i) until the threshold value is explicitly changed by the base station, or ii) until a predetermined period of time expires.

16. The non-transitory computer-readable medium of claim 13, further storing computer executable code that when executed by the processor cause the processor to, upon either i) the generated random number not meeting the threshold value or ii) a device of the processor not obtaining access in response to transmitting the random access preamble:
   change the threshold value before attempting the contention-based access to the wireless network within the subsequent set of random access occasions of the base station.

17. The non-transitory computer-readable medium of claim 16, further storing computer executable code that when executed by the processor cause the processor to increase the threshold value upon the generated random number not meeting the threshold value.

18. The non-transitory computer-readable medium of claim 16, further storing computer executable code that when executed by the processor cause the processor to decrease the threshold value upon the device not obtaining access in response to transmitting the random access preamble.

19. An apparatus for wireless communications, comprising:
   means for generating, for a set of random access occasions of a base station of a wireless network, a random number over an interval;
   means for transmitting, to the base station and for the generated random number meeting a threshold value within the interval, a random access preamble within one of the random access occasions of the set;
   means for attempting, for the generated random number not meeting the threshold value, contention-based access to the wireless network within a subsequent set of random access occasions of the base station, the subsequent set of random access occasions occurring after the set of random access occasions of the base station; and
   means for receiving, from the base station prior to transmitting, the threshold value as an information element in at least one of a Radio Resource Control Message, a Downlink Control Information (DCI) message, a Medium Access Control-Control Element (MAC-CE) message, and a paging message.

20. The apparatus of claim 19, wherein the set of random access occasions is characterized by one of:
   a set of {time slot, frequency, beam} tuples, distributing the set of random access occasions across multiple time slots, frequencies, and beams;
   a set of {time slot, frequency} tuples, distributing the set of random access occasions across multiple time slots and frequencies, on a single beam;
   a set of {time slot, beam} tuples, distributing the set of random access occasions across multiple time slots and beams, on a single frequency;
   a set of {frequency, beam} tuples, distributing the set of random access occasions across multiple frequencies and beams, in a single time slot;
   a set of time slots distributing the set of random access occasions across time slots on a single {frequency, beam} tuple; and
   a set of frequencies distributing the set of random access occasions across frequencies on a single {time slot, beam} tuple.

21. The apparatus of claim 19, wherein the threshold value remains valid i) until the threshold value is explicitly changed by the base station, or ii) until a predetermined period of time expires.

22. The apparatus of claim 19, further comprising:
   means for changing, upon either i) the generated random number not meeting the threshold value or ii) the apparatus not obtaining access in response to transmitting the random access preamble, the threshold value before attempting the contention-based access to the wireless network within the subsequent set of random access occasions of the base station.

23. The apparatus of claim 22, further comprising means for increasing the threshold value upon the generated random number not meeting the threshold value.

24. The apparatus of claim 22, further comprising means for decreasing the threshold value upon the apparatus not obtaining access in response to transmitting the random access preamble.

* * * * *